(12) United States Patent
Satou et al.

(10) Patent No.: US 9,669,778 B2
(45) Date of Patent: Jun. 6, 2017

(54) CLAMPING MEMBER

(75) Inventors: Mitsuru Satou, Kariya (JP); Masahiro Tsuchiya, Kariya (JP)

(73) Assignee: Toyota Shatai Kabushiki Kaisha, Aichi-ken (JP)

(*) Notice: Subject to any disclaimer, the term of this patent is extended or adjusted under 35 U.S.C. 154(b) by 11 days.

(21) Appl. No.: 13/821,209

(22) PCT Filed: Oct. 3, 2011

(86) PCT No.: PCT/JP2011/072807
§ 371 (c)(1),
(2), (4) Date: Mar. 6, 2013

(87) PCT Pub. No.: WO2013/051090
PCT Pub. Date: Apr. 11, 2013

(65) Prior Publication Data
US 2014/0008501 A1    Jan. 9, 2014

(51) Int. Cl.
B60R 16/02 (2006.01)
B60R 13/02 (2006.01)
F16L 3/00 (2006.01)
F16L 3/08 (2006.01)

(52) U.S. Cl.
CPC ...... B60R 16/0215 (2013.01); B60R 13/0206 (2013.01); B60R 13/0275 (2013.01); F16L 3/00 (2013.01); F16L 3/08 (2013.01)

(58) Field of Classification Search
CPC ............ B60R 13/0275; B60R 16/0215; B60R 13/0206; F16L 3/00; F16L 3/08
USPC .............................. 248/65, 71, 73, 74.1, 74.3
See application file for complete search history.

(56) References Cited

U.S. PATENT DOCUMENTS

| | | | | |
|---|---|---|---|---|
| 4,386,752 A | * | 6/1983 | Pavlak | F16L 3/127 24/543 |
| 4,457,482 A | * | 7/1984 | Kitagawa | F16L 3/23 248/73 |
| 5,535,969 A | * | 7/1996 | Duffy, Jr. | F16L 3/227 24/487 |

(Continued)

FOREIGN PATENT DOCUMENTS

| CN | 1937340 A | 3/2007 |
|---|---|---|
| CN | 101640395 A | 2/2010 |

(Continued)

OTHER PUBLICATIONS

English translation of the International Preliminary Report on Patentability—PCT/JP2011/072807, dated Apr. 8, 2014, 6 pages.

(Continued)

Primary Examiner — Muhammad Ijaz
(74) Attorney, Agent, or Firm — Kilpatrick Townsend & Stockton LLP

(57) ABSTRACT

Clamping members (12) are assembled to each side portion of a vehicle floor panel (11). Each clamping member (12) has a base portion (13). The base portion (13) has a wire harness holding portion (15), a sandwiched supporting piece (16), and a clip (24). The wire harness holding portion (15) receives a wire harness (14). The base portion (13) is assembled to the floor panel (11) by the clip (24). The sandwiched supporting piece (16) is formed such that its thickness decreases toward the distal end. The distal end of the sandwiched supporting piece (16) is held between an opening trim (29) and the floor panel (11).

5 Claims, 4 Drawing Sheets

(56) References Cited

U.S. PATENT DOCUMENTS

| | | | |
|---|---|---|---|
| 6,394,695 B1 * | 5/2002 | Chausset | B60R 21/216 248/71 |
| 6,669,149 B2 * | 12/2003 | Akizuki | H02G 3/26 248/222.12 |
| 7,140,070 B2 * | 11/2006 | Yuta | B60N 3/046 16/17 |
| 7,677,593 B2 * | 3/2010 | Downey | B60R 13/0206 280/728.2 |
| 7,698,788 B2 * | 4/2010 | Hansen | B60R 21/213 24/297 |
| 8,157,222 B1 * | 4/2012 | Shirey | H02G 3/263 248/68.1 |
| 2003/0213876 A1 * | 11/2003 | Takeuchi | F16B 21/02 248/71 |
| 2004/0108421 A1 * | 6/2004 | Yuta | B60N 3/046 248/71 |
| 2004/0188571 A1 * | 9/2004 | Stigler | B60R 16/0215 248/74.1 |
| 2005/0082813 A1 * | 4/2005 | Seong | B60R 13/0206 280/782 |
| 2007/0063116 A1 | 3/2007 | Sugimoto et al. | |
| 2008/0217488 A1 * | 9/2008 | Carretero | F16L 3/13 248/65 |
| 2009/0158687 A1 * | 6/2009 | Stepan | B60R 13/04 52/716.6 |
| 2011/0260025 A1 * | 10/2011 | Aoshima | B60R 16/0215 248/231.81 |
| 2013/0001373 A1 * | 1/2013 | Ogawa | F16L 3/1041 248/65 |
| 2013/0313376 A1 * | 11/2013 | Shirey | B60R 16/0215 248/74.3 |

FOREIGN PATENT DOCUMENTS

| | | | | |
|---|---|---|---|---|
| EP | 1935722 A1 * | 6/2008 | | |
| GB | EP 1935722 A1 * | 6/2008 | | B60R 13/0206 |
| JP | 7-315102 A | 5/1995 | | |
| JP | 2004122809 B2 | 2/2004 | | |
| JP | 2004122809 A | 4/2004 | | |
| JP | 2007307921 A | 11/2007 | | |
| JP | 2009274535 A | 11/2009 | | |

OTHER PUBLICATIONS

Office Action corresponding to Chinese Patent Application No. 201180047947.2, seven pages.

* cited by examiner

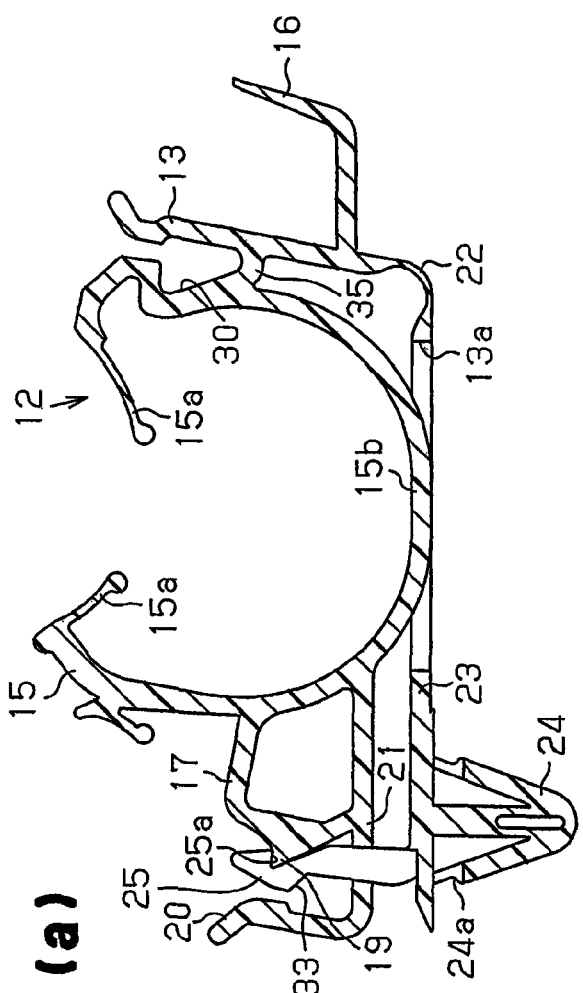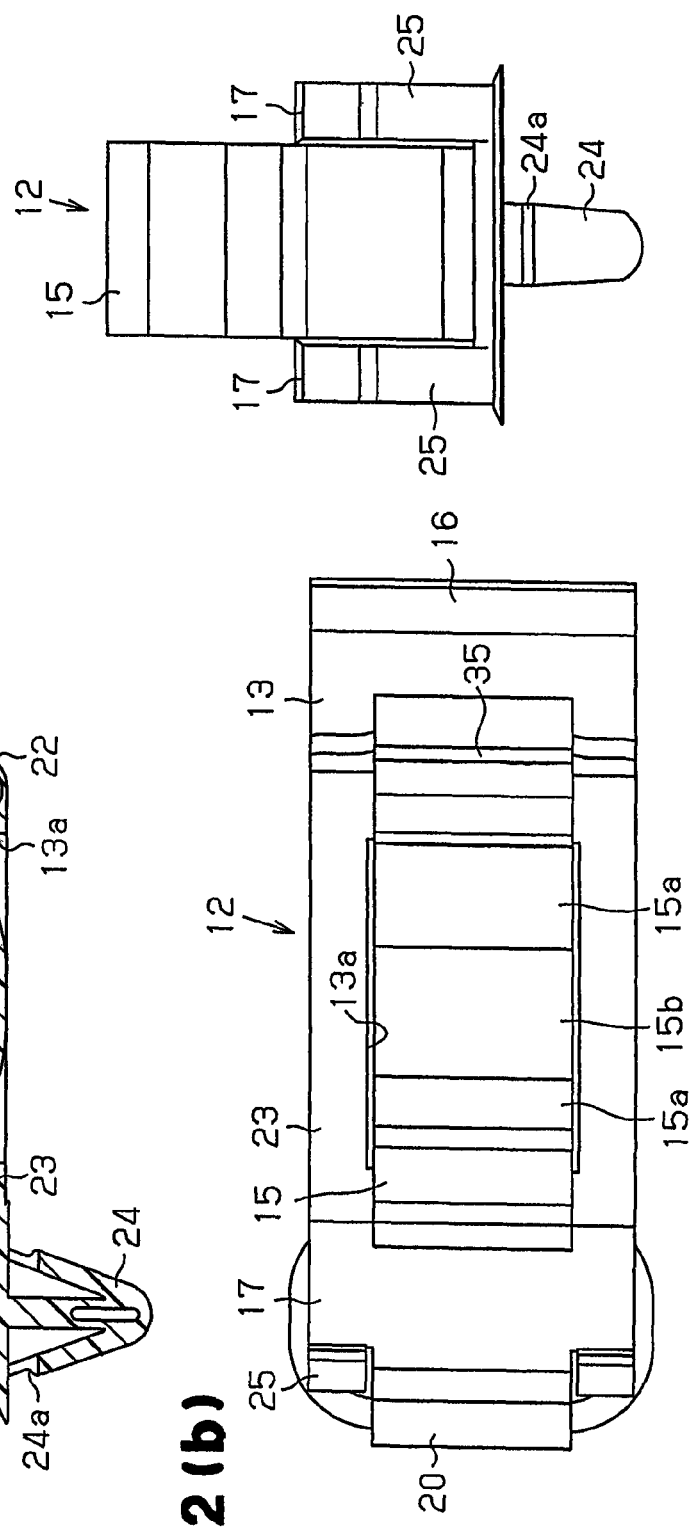

CLAMPING MEMBER

FIELD OF THE INVENTION

The present invention relates to a clamping member that is assembled to a body of a vehicle and holds wire harness arranged along a side portion of the vehicle.

BACKGROUND OF THE INVENTION

This type of clamping member is arranged in a side portion of a vehicle body (floor panel). Clamping members are used for holding a wire harness and a washer hose in a space between the body and a scuff plate covering the inner surface of the body. Clamping members have a clip at the bottom. The clamping members are fixed to the vehicle body by the clips.

Patent Document 1 discloses a harness clamp for holding a wire harness. The harness clamp disclosed in the document includes a clamp base, a wire harness holding portion, and an anchoring portion. The clamp base has a clip and a carpet-engaging projection. The wire harness holding portion is formed to be pivotal relative to the clamp base. The wire harness holding portion is anchored to the clamp base by the anchoring portion while the clamp base and the wire harness holding portion hold an edge of a floor carpet in between. The harness clamp allows the order in which the wire harness and the floor carpet are assembled to be changed. Particularly, in a case in which a wire harness is installed prior to installation of a floor carpet, the floor carpet can be placed underneath the wire harness.

However, according to the configuration of Patent Document 1, the harness clamp is fixed to the body only by the clip. Therefore, when a strong force is applied to the harness clamp, the position of the harness clamp may be displaced. In such a case, a scuff plate cannot be installed to cover the harness clamp. Also, the positional accuracy of the clamping member assembled to the vehicle body and various types of parts related to the clamping member and the vehicle body is lowered.

PRIOR ART DOCUMENT

Patent Document

Patent Document 1: Japanese Laid-Open Patent Publication No. 7-315102

SUMMARY OF THE INVENTION

Accordingly, it is an objective of the present invention to provide a clamping member that improves the positional accuracy of the clamping member assembled to a vehicle body and various types of parts related to the clamping member.

To achieve the foregoing objective and in accordance with a first aspect of the present invention, a clamping member is provided that includes a base portion, which is adapted to be assembled to a body of a vehicle, and a wire harness holding portion. The clamping member further includes a clip, which is provided in the base portion to assemble the base portion to the body, and a sandwiched supporting piece, which is provided in the base portion and has a distal end to be sandwiched between the body and an opening trim attached to the body.

In this configuration, the base portion has the clip for installing the base portion to the body. The base portion further includes a sandwiched supporting piece, which has a distal end sandwiched between the body and the opening trim attached to the body. In this case, the clamping member is attached to the body by the sandwiched supporting piece as well as by the clip. Therefore, when a strong force is applied to the clamping member, the force is received by the body via both of the clip and the sandwiched supporting piece. This restricts movement of the base portion relative to the body. Accordingly, the position of the clamping member is not displaced, which improves the positional accuracy of various parts held by the clamping member.

In the above described the clamping member, the sandwiched supporting piece is preferably formed integrally with the base portion.

In the above described clamping member, the sandwiched supporting piece is preferably formed such that its thickness decreases toward a distal end.

In the above described clamping member, the sandwiched supporting piece is preferably located on an opposite side of the wire harness holding portion to the clip.

In the above described clamping member, the base portion preferably includes a bend portion, which is bent relative to the base portion at a hinge portion, and the base portion is preferably engaged with the distal end of the bend portion with a carpet held between the bend portion and the base portion.

In the above described clamping member, the clip is preferably provided in the bend portion.

In the above described clamping member, an opening is preferably formed in the bend portion, and a bottom wall of the wire harness holding portion is preferably located within the opening.

BRIEF DESCRIPTION OF THE DRAWINGS

FIG. 2(*a*) is a cross-sectional view of the clamping member;

FIG. 2(*b*) is a plan view of the clamping member;

FIG. 2(*c*) is a left side view of the clamping member;

DETAILED DESCRIPTION OF THE PREFERRED EMBODIMENTS

One embodiment of the present invention will now be described with reference to FIGS. 1 to 4.

Figure 1:
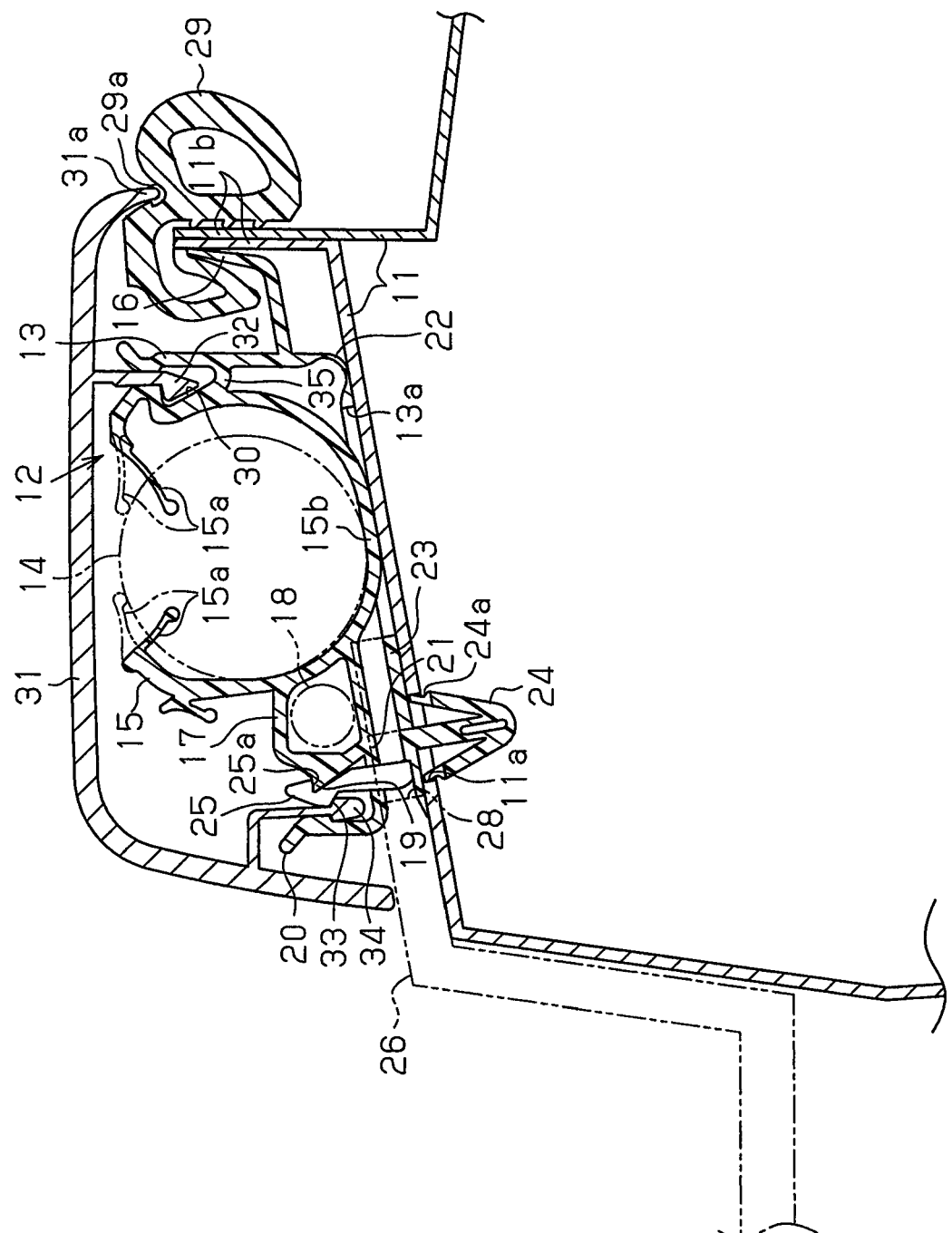
FIG. 1 is a cross-sectional view illustrating a clamping member according to one embodiment of the present invention, showing a state in which the clamping member is assembled to the body of a vehicle.

With reference to FIG. 1, clamping members 12 are assembled to each side portion of a vehicle floor panel 11. The clamping members 12 are arranged at several positions in the front-rear direction of the vehicle. The clamping members 12 are formed of plastic such as polypropylene plastic. Each clamping member 12 has a base portion 13, a wire harness holding portion 15, and a coupling portion 35. The base portion 13 is formed integrally with the wire harness holding portion 15 via the coupling portion 35.

As shown in FIG. 2(*a*) and the left side of FIG. 2(*b*), the wire harness holding portion 15 is formed on the inner side of the base portion 13. The width of the wire harness holding portion 15 is smaller than the width of the base portion 13. On the other hand, as shown in FIG. 2(*a*) and the right side of FIG. 2(*b*), a sandwiched supporting piece 16 is formed on the outer side of the base portion 13. The sandwiched supporting piece 16 has a laterally facing L-shaped cross section. The thickness of the sandwiched supporting piece 16 decreases toward the distal end.

The wire harness holding portion 15 is formed to be substantially arcuate. The wire harness holding portion 15 has a pair of holding pieces 15a and a bottom wall 15b. One holding piece 15a is formed at either end of the wire harness holding portion 15. When the wire harness 14 is held by the holding pieces 15a as indicated by alternate long and two short dashed lines in FIG. 1, the wire harness 14 is restricted from moving within the wire harness holding portion 15. The base portion 13 has an opening 13a, which is a rectangular hole. The bottom wall 15b is arranged in the opening 13a.

A holding tubular portion 17 is formed on a side of the wire harness holding portion 15. As indicated by an alternate long and two short dashed lines in FIG. 1, a washer hose 18 is placed in the holding tubular portion 17. An engaging portion 19 is formed on a side wall of the holding tubular portion 17. A laterally extending anchoring projection 20 is formed on the bottom of the holding tubular portion 17. The anchoring projection 20 is formed to have an inverted L-shaped cross section. The bottom of the holding tubular portion 17 and the flat part of the anchoring projection 20 form a carpet holding portion 21.

Figure 3:
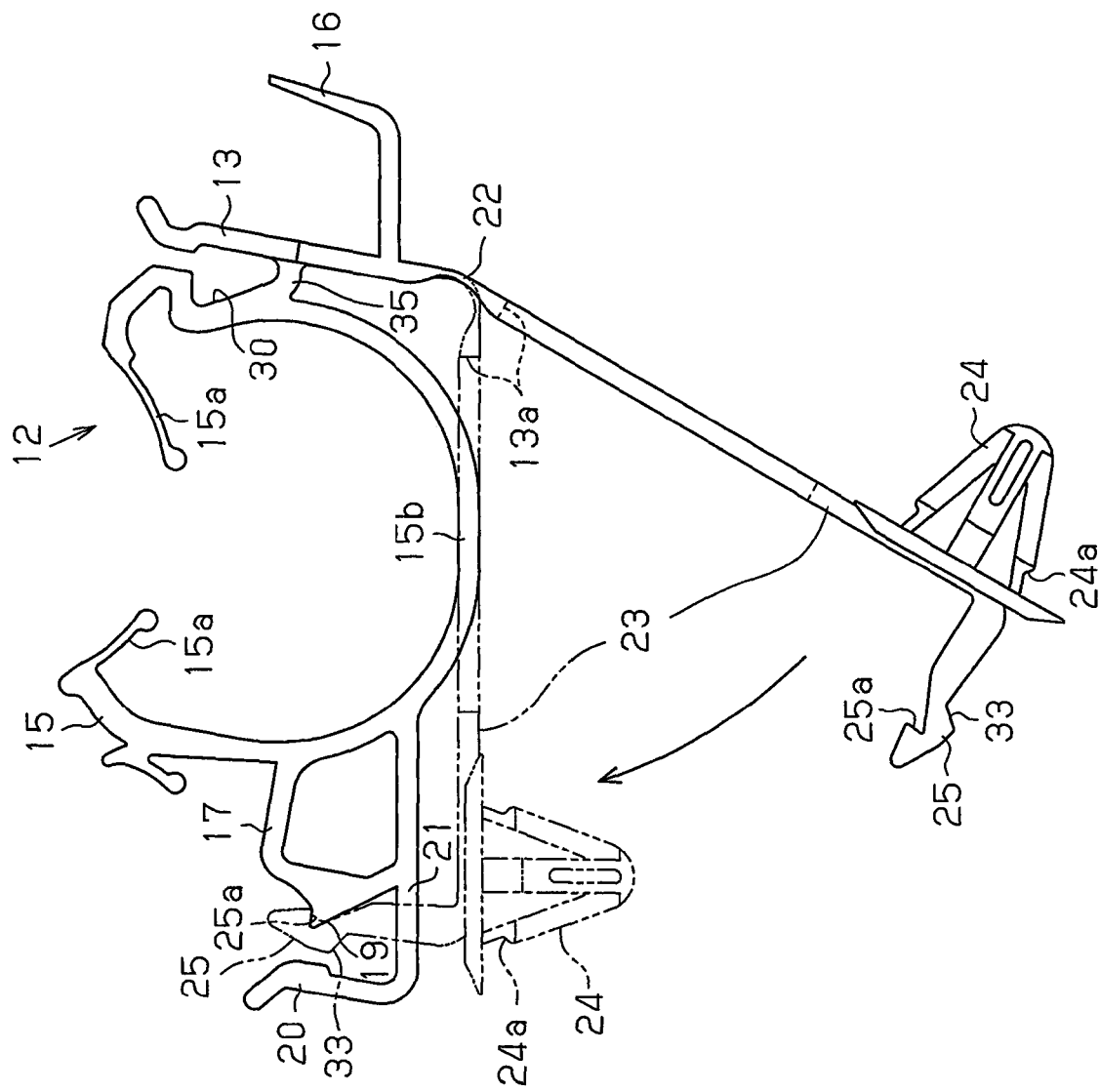
FIG. 3 is a front view of the clamping member.

As shown in FIG. 3, the base portion 13 has a bend portion 23. The bend portion 23 is bent relative to the remainder of the base portion 13 at an integral hinge 22. The integral hinge 22 is a hinge portion, which is formed to be thin. A clip 24 and an engaging portion 25 are formed at the distal end of the bend portion 23. The clip 24 is sharpened and extends downward. As shown in FIG. 1, the floor panel 11 has a through hole 11a, in which the clip 24 is anchored. That is, the clip 24 is passed through the through hole 11a, and the floor panel 11 is arranged between the bend portion 23 and a step 24a of the clip 24, so that the clamping member 12 is assembled to the floor panel 11. The engaging portion 25 is located on a side of the bend portion 23 opposite to the clip 24. The engaging portion 25 has an engaging recess 25a.

Figure 4:
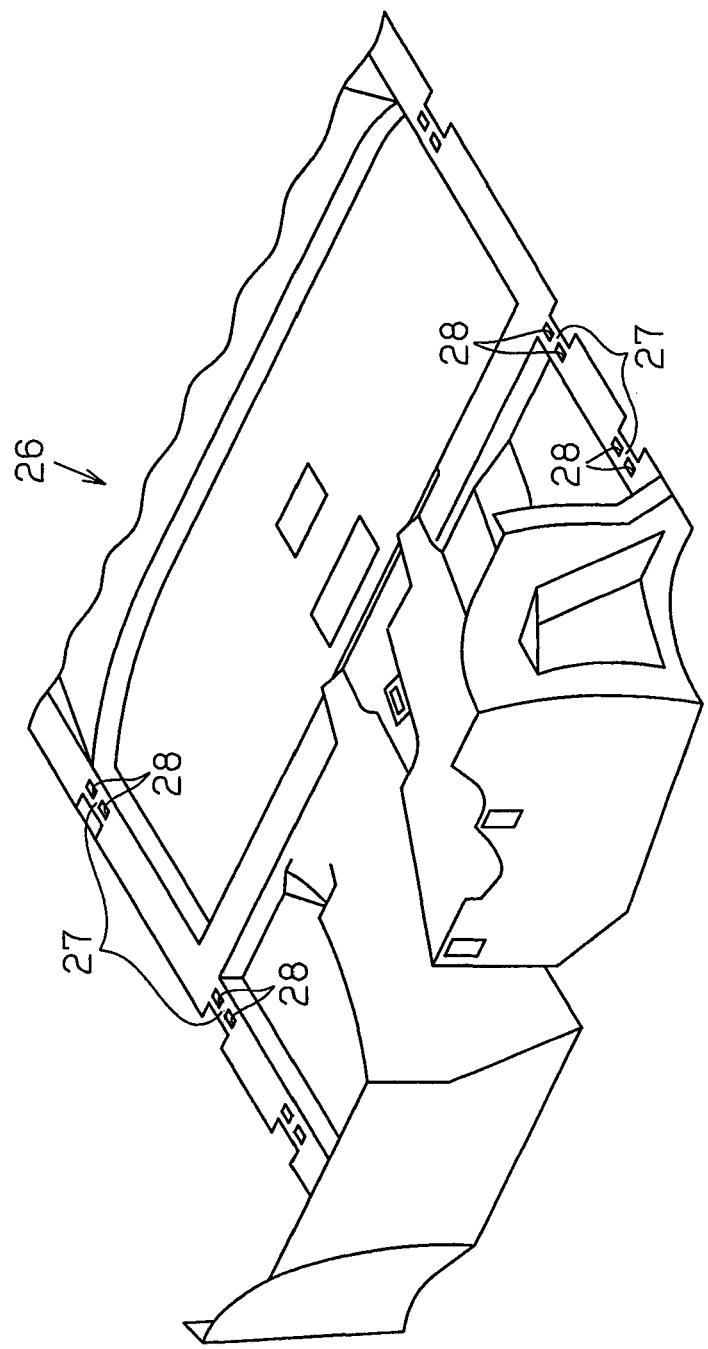
FIG. 4 is a diagrammatic perspective view illustrating a carpet.

As shown in FIG. 1, when the bend portion 23 is bent, a carpet 26, which is illustrated in FIG. 4, is held between the bend portion 23 and the carpet holding portion 21. In this state, the engaging portion 19 of the holding tubular portion 17 is engaged with the engaging recess 25a of the engaging portion 25. The carpet 26 has clamping member receiving portions 27, each of which has a pair of attachment holes 28. With the engaging portion 25 inserted in the attachment hole 28 and the clip 24 inserted in the through hole 11a, the engaging portion 19 is engaged with the engaging recess 25a. This fixes the carpet 26 onto the floor panel 11.

As shown in FIG. 1, the floor panel 11 has an upright portion 11b at the side. An opening trim 29 is attached to the upright portion 11b in a manner sandwiching the upright portion 11b. The opening trim 29 is made of olefin-based soft plastic. The opening trim 29 thus has elasticity. The distal end of the sandwiched supporting piece 16 is held between the opening trim 29 and the upright portion 11b. The sandwiched supporting piece 16 is located on the opposite side of the wire harness holding portion 15 to the clip 24.

A first anchoring recess 30 is located between the base portion 13 and the wire harness holding portion 15. A scuff plate 31 includes a first anchoring projection 32 and a second anchoring projection 34. The first anchoring projection 32 is anchored to the first anchoring recess 30. The engaging portion 25 of the bend portion 23 has a second anchoring recess 33. The second anchoring projection 34 is anchored to the second anchoring recess 33. An outer end 31a of the scuff plate 31 is received by an indentation 29a of the opening trim 29. The scuff plate 31 is attached to the clamping member 12 from above to cover the clamping member 12.

Operation of the clamping member 12 will now be described.

When mounting the clamping members 12 to the floor panel 11, the opening trim 29 is attached to the upright portion 11b of the floor panel 11 as shown in FIG. 1. In this state, the clamping members 12 are arranged on the floor panel 11. Then, the sandwiched supporting pieces 16 of the clamping members 12 is fitted from below between the upright portion 11b of the floor panel 11 and the opening trim 29. Next, the clips 24 are inserted into the through holes 11a of the floor panel 11. At this time, the clips 24 are pushed to positions where the floor panel 11 is located between the steps 24a of the clips 24 and the bend portions 23. In this state, since both sides of the clamping members 12 are fixed to the floor panel 11, movement of the wire harness holding portions 15 relative to the floor panel 11 is restricted.

The wire harness holding portions 15 are then lifted, and the carpet 26 is inserted between the bend portions 23 and the carpet holding portions 21. Subsequently, the engaging portions 25 of the bend portions 23 are inserted into the attachment holes 28 of the carpet 26. The engaging portion 19 of the holding tubular portion 17 is then engaged with the engaging recess 25a of the engaging portion 25. The carpet 26 is therefore easily fixed to the floor panel 11.

Thereafter, the wire harness 14 is received by the wire harness holding portions 15. As indicated by alternate long and two short dashed lines in FIG. 1, the wire harness 14 is routed in a stable fashion by being held by the holding pieces 15a of the wire harness holding portions 15. Further, the washer hose 18 is received by the holding tubular portions 17. The holding tubular portion 17 fixes the position of the washer hose 18 and determines the route of the washer hose 18.

Lastly, the scuff plate 31 is arranged above the clamping members 12. Then, the first anchoring projection 32 is inserted into the first anchoring recess 30, and the second anchoring projection 34 is inserted into the second anchoring recess 33, so that the scuff plate 31 is assembled with the clamping members 12. Accordingly, the clamping members 12 allow the wire harness 14, the washer hose 18, the carpet 26, and the scuff plate 31 to be installed at predetermined positions on the floor panel 11.

The present embodiment has the following advantages.

(1) Each clamping member 12 has the base portion 13. The base portion 13 has the clip 24 and the sandwiched supporting piece 16. In this case, the clamping member 12 is attached to the floor panel 11 by the sandwiched supporting piece 16 as well as by the clip 24. Therefore, when a strong force is applied to the clamping member 12, the force is received by the floor panel 11 via the clip 24 and the sandwiched supporting piece 16. This restricts movement of the base portions 13 relative to the floor panel 11. Since the position of each clamping member 12 is prevented from being displaced, components such as the wire harness 14, the washer hose 18, the carpet 26, and the scuff plate 31 are installed at predetermined positions.

(2) The sandwiched supporting piece 16 is formed integrally with the base portion 13. This simplifies the structure of the clamping member 12. Also, the sandwiched supporting piece 16 can be formed simultaneously with molding of the base portion 13.

(3) The sandwiched supporting piece 16 is formed such that its thickness decreases toward the distal end. The sandwiched supporting piece 16 therefore can be easily inserted between the upright portion 11b of the floor panel 11 and the opening trim 29.

(4) The sandwiched supporting piece 16 is located on the opposite side of the wire harness holding portion 15 to the clip 24. This further stabilizes the installation of the clamping members 12 to the floor panel 11.

(5) The base portion 13 has the bend portion 23. The bend portion 23 is bent relative to the remainder of the base portion 13 at an integral hinge 22. The bend portion 23 is formed to cause the engaging portion 19 to be engaged with the engaging recess 25a of the engaging portion 25 while sandwiching the carpet 26 with the base portion 13. This structure simplifies the configuration for installing the carpet 26. Also, the carpet 26 is assembled to the floor panel 11 through a simple operation.

(6) The bend portion 23 has the clip 24. This simplifies the structure of the entire clamping member 12. Also, the clip 24 can be molded simultaneously with the bend portion 23.

(7) The opening 13a is formed in the bend portion 23. The bottom wall 15b of the wire harness holding portion 15 is arranged in the opening 13a. This allows the position of the wire harness holding portion 15 to be lowered, so that the height of the entire clamping member 12 is reduced. That is, the height of the clamping member 12 is reduced at the lower end of the vehicle door. This facilitates entry into and exit from the vehicle.

The present embodiment may be modified as follows.

The clip 24 may be located at a middle portion of the bend portion 23.

The sandwiched supporting piece 16 may be separately formed from the base portion 13. In this case, the sandwiched supporting portion 16 can be adhered to or joined to the base portion 13.

The wire harness 14 and the washer hose 18 may be assembled to the clamping members 12 before the clamping members 12 are assembled to the floor panel 11.

The invention claimed is:

1. A clamping member, comprising:
a base portion, which is adapted to be assembled to a body of a vehicle, and a wire harness holding portion;
a clip, which is provided in the base portion to assemble the base portion to the body;
an engaging portion formed in the base portion and projects in a generally opposite direction as the clip, the engaging portion comprising an engaging recess; and
a sandwiched supporting piece, which is provided in the base portion and has a distal end that is adapted to be sandwiched between the body and an opening trim attached to the body,
wherein the base portion has a bend portion, wherein the bend portion is bent relative to a remainder of the base portion at a hinge portion, and wherein the bend portion is located below the sandwiched supporting piece and between the sandwiched supporting piece and the clip;
wherein the wire harness holding portion includes a bottom wall that is coupled to the base portion and forms an arcuate cross section, and a pair of holding pieces that each have an end opposite of the bottom wall, wherein the ends of each of the holding pieces are curved inward;
wherein the clip and the engaging portion are formed at a distal end of the base portion, wherein the clip faces downward with respect to the bottom wall of the wire harness holding portion, and the engaging portion faces upward with respect to the bottom wall of the wire harness holding portion;
wherein a portion of the base defines a cutout proximate to a holding tubular portion, the cutout configured to receive the engaging portion;
wherein the engaging portion is insertable within the cutout such that the engaging recess mates with a second engaging member positioned on a first side of the base, thereby forming a carpet holding space between a carpet holding portion, the bend portion, and the engaging portion, the carpet holding portion configured to secure a portion of a carpet to the clamping member;
wherein the sandwiched supporting piece has a substantially L-shaped cross section having a first portion that extends laterally from the base portion, and a second portion defining said distal end of the sandwiched supporting piece that extends upward from the first portion; and
wherein said bend portion includes an opening that is configured to receive a portion of said wire harness holding portion, wherein the opening comprises a through hole that extends completely through the bend portion.

2. The clamping member according to claim 1, wherein the sandwiched supporting piece is formed integrally with the base portion.

3. The clamping member according to claim 1, wherein the sandwiched supporting piece is formed such that its thickness decreases toward the distal end of the sandwiched supporting piece.

4. The clamping member according to claim 1, wherein the sandwiched supporting piece is located on a side of the wire harness holding portion.

5. The clamping member according to claim 4, wherein the clip is provided in the bend portion.

* * * * *